United States Patent
Fouda et al.

(10) Patent No.: US 10,989,045 B2
(45) Date of Patent: Apr. 27, 2021

(54) MULTI-TUBULAR INVERSION WITH AUTOMATIC COST FUNCTIONAL OPTIMIZATION

(71) Applicant: Halliburton Energy Services, Inc., Houston, TX (US)

(72) Inventors: Ahmed Elsayed Fouda, Spring, TX (US); Ilker R. Capoglu, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 51 days.

(21) Appl. No.: 16/603,653

(22) PCT Filed: Nov. 13, 2018

(86) PCT No.: PCT/US2018/060717
§ 371 (c)(1),
(2) Date: Oct. 8, 2019

(87) PCT Pub. No.: WO2020/101652
PCT Pub. Date: May 22, 2020

(65) Prior Publication Data
US 2021/0054731 A1     Feb. 25, 2021

(51) Int. Cl.
*E21B 47/085*     (2012.01)
*E21B 47/092*     (2012.01)
(Continued)

(52) U.S. Cl.
CPC .......... *E21B 47/085* (2020.05); *E21B 47/092* (2020.05); *G01N 27/90* (2013.01); *G01V 3/30* (2013.01)

(58) Field of Classification Search
CPC ....... G01V 3/30; E21B 47/092; E21B 47/085; G01N 27/90
See application file for complete search history.

(56) References Cited

U.S. PATENT DOCUMENTS 7,960,969 B2    6/2011  Mouget et al.
9,715,034 B2    7/2017  Omeragic et al.
(Continued)

FOREIGN PATENT DOCUMENTS

WO    2017048263       9/2015
WO    2016007883 A1    1/2016
(Continued)

OTHER PUBLICATIONS

U.S. Appl. No. 16/334,671, filed Mar. 19, 2019.
(Continued)

*Primary Examiner* — Reena Aurora
(74) *Attorney, Agent, or Firm* — John Wustenberg; C. Tumey Law Group PLLC

(57) ABSTRACT

A method comprising: disposing an induction tool in a cased hole, wherein the induction tool comprises a transmitter and a receiver; broadcasting electromagnetic fields from the transmitter into a subterranean formation to form an eddy current; recording the eddy current with the receiver to produce induction measurements; obtaining a log comprising at least one channel from the induction measurements; constructing an inversion cost functional comprising a misfit term and a regularization term; performing a first inversion using the inversion cost functional to estimate pipe properties at a first plurality of depth points; optimizing the inversion cost functional such that the estimated pipe properties at the first plurality of depth points minimize an objective functional; performing a second inversion using the optimized inversion cost functional to estimate pipe properties at a second plurality of depth points; and displaying the pipe properties at the second plurality of depth points to a user.

20 Claims, 6 Drawing Sheets

(51) Int. Cl.
    *G01N 27/90*     (2021.01)
    *G01V 3/30*     (2006.01)

(56)     References Cited

U.S. PATENT DOCUMENTS

| | | | |
|---|---|---|---|
| 10,317,331 B2 * | 6/2019 | Guner | G01V 3/28 |
| 10,823,873 B2 * | 11/2020 | Fouda | E21B 47/00 |
| 2009/0195244 A1 | 8/2009 | Mouget et al. | |
| 2010/0134112 A1 | 6/2010 | Zhang et al. | |
| 2010/0263449 A1 | 10/2010 | Bolshakov et al. | |
| 2015/0338541 A1 | 11/2015 | Nichols et al. | |
| 2018/0074220 A1 * | 3/2018 | David | G01V 3/26 |
| 2018/0172872 A1 | 6/2018 | Fouda et al. | |

FOREIGN PATENT DOCUMENTS

| | | |
|---|---|---|
| WO | 2017196357 A1 | 11/2017 |
| WO | 2018031038 A1 | 2/2018 |
| WO | 2018080462 A1 | 5/2018 |
| WO | 2019094225 | 5/2019 |

OTHER PUBLICATIONS

ISRWO International Search Report and Written Opinion for PCT/US2018/060717 dated Aug. 9, 2019.
D. Abdallah, M. Fahim, K. Al-Hendi, M. Al-Muhailan, etc, "Casing Corrosion Measurement to Extend Asset Life", 2013.

* cited by examiner

US 10,989,045 B2

MULTI-TUBULAR INVERSION WITH AUTOMATIC COST FUNCTIONAL OPTIMIZATION

BACKGROUND

For oil and gas exploration and production, a network of wells, installations and other conduits may be established by connecting sections of metal pipe together. For example, a well installation may be completed, in part, by lowering multiple sections of metal pipe (i.e., a casing string) into a wellbore, and cementing the casing string in place. In some well installations, multiple casing strings are employed (e.g., a concentric multi-string arrangement) to allow for different operations related to well completion, production, or enhanced oil recovery (EOR) options.

Corrosion of metal pipes is an ongoing issue. Efforts to mitigate corrosion include use of corrosion-resistant alloys, coatings, treatments, and corrosion transfer, among others. Also, efforts to improve corrosion monitoring are ongoing. For downhole casing strings, various types of corrosion monitoring tools are available. One type of corrosion monitoring tool uses electromagnetic (EM) fields to estimate pipe thickness or other corrosion indicators. As an example, an EM logging tool may collect data on pipe thickness to produce an EM log. The EM log data may be interpreted to determine the condition of production and inter mediate casing strings, tubing, collars, filters, packers, and perforations. When multiple casing strings are employed together, correctly managing corrosion detection EM logging tool operations and data interpretation may be complex.

BRIEF DESCRIPTION OF THE DRAWINGS

These drawings illustrate certain aspects of some examples of the present disclosure, and should not be used to limit or define the disclosure.

DETAILED DESCRIPTION

This disclosure may generally relate to methods for identifying artifacts with an electromagnetic logging tool in an eccentric pipe configuration comprising a plurality of pipes. Electromagnetic (EM) sensing may provide continuous in situ measurements of parameters related to the integrity of pipes in cased boreholes. As a result, EM sensing may be used in cased borehole monitoring applications. EM logging tools may be configured for multiple concentric pipes (e.g., for one or more) with the first pipe diameter varying (e.g., from about two inches to about seven inches or more). EM logging tools may measure eddy currents to determine metal loss and use magnetic cores at the transmitters. The EM logging tools may use pulse eddy current (time-domain) and may employ multiple (long, short, and transversal) coils to evaluate multiple types of defects in double pipes. It should be noted that the techniques utilized in time-domain may be utilized in frequency-domain measurements. The EM logging tools may operate on a conveyance. EM logging tools may include an independent power supply and may store the acquired data on memory. A magnetic core may be used in defect detection in multiple concentric pipes.

Monitoring the condition of the production and intermediate casing strings is crucial in oil and gas field operations. EM eddy current (EC) techniques have been successfully used in inspection of these components. EM EC techniques consist of two broad categories: frequency-domain EC techniques and time-domain EC techniques. In both techniques, one or more transmitters are excited with an excitation signal, and the signals from the pipes are received and recorded for interpretation. The received signal is typically proportional to the amount of metal that is around the transmitter and the receiver. For example, less signal magnitude is typically an indication of more metal, and more signal magnitude is an indication of less metal. This relationship may allow for measurements of metal loss, which typically is due to an anomaly related to the pipe such as corrosion or buckling.

In case of multiple nested pipe stings, the received signal may be a non-linear combination of signals from all pipes. As a result, it is not possible, in general, to use a simple linear relationship to relate the signal received to metal loss or gain for pipe strings composed of three or more nested pipes. In order to address this problem, a method called "inversion" is used. Inversion makes use of a forward model and compares it to the signal to determine the thickness of each pipe. The forward model is executed repeatedly until a satisfactory match between the modeled signal and measured signal is obtained. The forward model typically needs to be run hundreds of times or more for each logging point.

Figure 1:
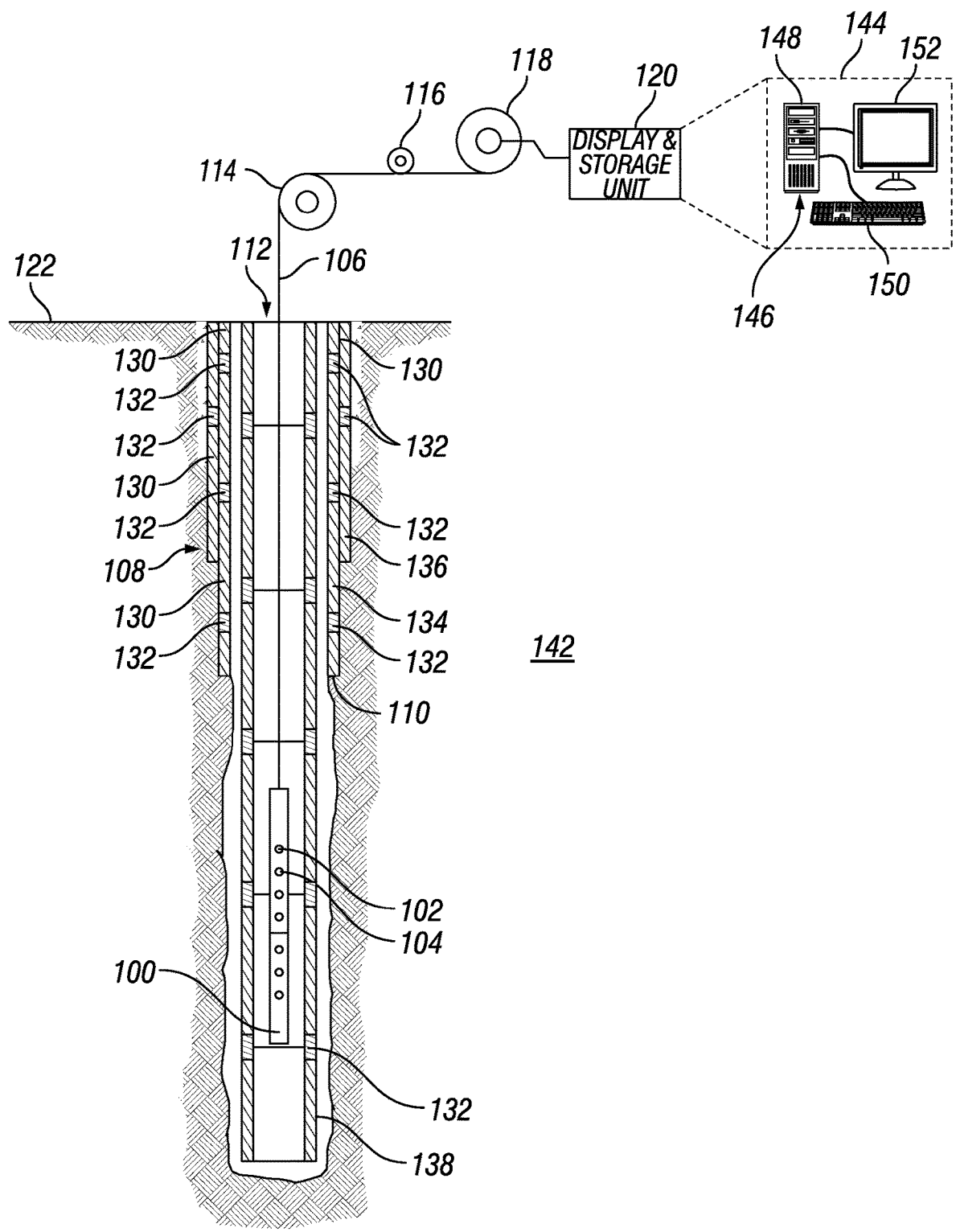
FIG. 1 illustrates an example of an EM logging tool disposed in a wellbore.

FIG. 1 illustrates an operating environment for an EM logging tool 100 as disclosed herein. EM logging tool 100 may comprise a transmitter 102 and/or a receiver 104. In examples, EM logging tool 100 may be an induction tool that may operate with continuous wave execution of at least one frequency. This may be performed with any number of transmitters 102 and/or any number of receivers 104, which may be disposed on EM logging tool 100. In additional examples, transmitter 102 may function and/or operate as a receiver 104. EM logging tool 100 may be operatively coupled to a conveyance 106 (e.g., wireline, slickline, coiled tubing, pipe, downhole tractor, and/or the like) which may provide mechanical suspension, as well as electrical connectivity, for EM logging tool 100. Conveyance 106 and EM logging tool 100 may extend within casing string 108 to a desired depth within the wellbore 110. Conveyance 106, which may include one or more electrical conductors, may exit wellhead 112, may pass around pulley 114, may engage odometer 116, and may be reeled onto winch 118, which may be employed to raise and lower the tool assembly in the wellbore 110. Signals recorded by EM logging tool 100 may be stored on memory and then processed by display and storage unit 120 after recovery of EM logging tool 100 from wellbore 110. Alternatively, signals recorded by EM logging tool 100 may be conducted to display and storage unit 120 by way of conveyance 106. Display and storage unit 120 may process the signals, and the information contained therein may be displayed for an operator to observe and stored for future processing and reference. It should be noted that an operator may include an individual, group of individuals, or organization, such as a service company. Alternatively, signals may be processed downhole prior to receipt by display and storage unit 120 or both downhole and at surface 122, for example, by display and storage unit 120. Display and storage unit 120 may also contain an apparatus for supplying control signals and power to EM logging tool 100. Typical casing string 108 may extend from wellhead 112 at or above ground level to a selected depth within a wellbore 110. Casing string 108 may comprise a plurality of joints 130 or segments of casing string 108, each joint 130 being connected to the adjacent segments by a collar 132. There may be any number of layers in casing string 108. For example, a first casing 134 and a second casing 136. It should be noted that there may be any number of casing layers.

FIG. 1 also illustrates a typical pipe string 138, which may be positioned inside of casing string 108 extending part of the distance down wellbore 110. Pipe string 138 may be production tubing, tubing string, casing string, or other pipe disposed within casing string 108. Pipe string 138 may comprise concentric pipes. It should be noted that concentric pipes may be connected by collars 132. EM logging tool 100 may be dimensioned so that it may be lowered into the wellbore 110 through pipe string 138, thus avoiding the difficulty and expense associated with pulling pipe string 138 out of wellbore 110.

In logging systems, such as, for example, logging systems utilizing the EM logging tool 100, a digital telemetry system may be employed, wherein an electrical circuit may be used to both supply power to EM logging tool 100 and to transfer data between display and storage unit 120 and EM logging tool 100. A DC voltage may be provided to EM logging tool 100 by a power supply located above ground level, and data may be coupled to the DC power conductor by a baseband current pulse system. Alternatively, EM logging tool 100 may be powered by batteries located within the downhole tool assembly, and/or the data provided by EM logging tool 100 may be stored within the downhole tool assembly, rather than transmitted to the surface during logging (corrosion detection).

EM logging tool 100 may be used for excitation of transmitter 102. Transmitter 102 may broadcast electromagnetic fields into subterranean formation 142. Transmitter 102 may be any suitable device including, but not limited to, a wire antenna, a toroidal antenna, a solenoid, and/or button electrodes. It should be noted that broadcasting electromagnetic fields may also be referred to as transmitting electromagnetic fields. The electromagnetic fields from transmitter 102 may be referred to as a primary electromagnetic field. The primary electromagnetic fields may produce Eddy currents in casing string 108 and pipe string 138. These Eddy currents, in turn, produce secondary electromagnetic fields that may be sensed and/or measured with the primary electromagnetic fields by receivers 104. Characterization of casing string 108 and pipe string 138, including determination of pipe attributes, may be performed by measuring and processing these electromagnetic fields. Pipe attributes may include, but are not limited to, pipe thickness, pipe conductivity, and/or pipe permeability.

As illustrated, receivers 104 may be positioned on the EM logging tool 100 at selected distances (e.g., axial spacing) away from transmitters 102. Receivers 104 may be any suitable device including, but not limited to, wire antennas, toroidal antennas, solenoids, and/or button electrodes. The axial spacing of receivers 104 from transmitters 102 may vary, for example, from about 0 inches (0 cm) to about 40 inches (101.6 cm) or more. It should be understood that the configuration of EM logging tool 100 shown on FIG. 1 is merely illustrative and other configurations of EM logging tool 100 may be used with the present techniques. A spacing of 0 inches (0 cm) may be achieved by collocating coils with different diameters. While FIG. 1 shows only a single array of receivers 104, there may be multiple sensor arrays where the distance between transmitter 102 and receivers 104 in each of the sensor arrays may vary. In addition, EM logging tool 100 may include more than one transmitter 102 and more or less than six of the receivers 104. In addition, transmitter 102 may be a coil implemented for transmission of magnetic field while also measuring EM fields, in some instances. Where multiple transmitters 102 are used, their operation may be multiplexed or time multiplexed. For example, a single transmitter 102 may broadcast, for example, a multi-frequency signal or a broadband signal. While not shown, EM logging tool 100 may include a transmitter 102 and receiver 104 that are in the form of coils or solenoids coaxially positioned within a downhole tubular (e.g., casing string 108) and separated along the tool axis. Alternatively, EM logging tool 100 may include a transmitter 102 and receiver 104 that are in the form of coils or solenoids coaxially positioned within a downhole tubular (e.g., casing string 108) and collocated along the tool axis.

Broadcasting of EM fields by the transmitter 102 and the sensing and/or measuring of secondary electromagnetic fields by receivers 104 may be controlled by display and storage unit 120, which may include an information handling system 144. As illustrated, the information handling system 144 may be a component of the display and storage unit 120. Alternatively, the information handling system 144 may be a component of EM logging tool 100. An information handling system 144 may include any instrumentality or aggregate of instrumentalities operable to compute, estimate, classify, process, transmit, broadcast, receive, retrieve, originate, switch, store, display, manifest, detect, record, reproduce, handle, or utilize any form of information, intelligence, or data for business, scientific, control, or other purposes. For example, an information handling system 144 may be a personal computer, a network storage device, or any other suitable device and may vary in size, shape, performance, functionality, and price.

Information handling system 144 may include a processing unit 146 (e.g., microprocessor, central processing unit, etc.) that may process EM log data by executing software or instructions obtained from a local non-transitory computer readable media 148 (e.g., optical disks, magnetic disks), The non-transitory computer readable media 148 may store software or instructions of the methods described herein. Non-transitory computer readable media 148 may include any instrumentality or aggregation of instrumentalities that may retain data and/or instructions for a period of time. Non-transitory computer readable media 148 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 144 may also include input device(s) 150 (e.g., keyboard, mouse, touchpad, etc.) and output device(s) 152 (e.g., monitor, printer, etc.). The input device(s) 150 and output device(s) 152 provide a user interface that enables an operator to interact with EM logging tool 100 and/or software executed by processing unit 146. For example, information handling system 144 may enable an operator to select analysis options, view collected log data, view analysis results, and/or perform other tasks.

EM logging tool 100 may use any suitable EM technique based on Eddy current ("EC") for inspection of concentric pipes (e.g., casing string 108 and pipe string 138). EC techniques may be particularly suited for characterization of a multi-string arrangement in which concentric pipes are used. EC techniques may include, but are not limited to, frequency-domain EC techniques and time-domain EC techniques.

In frequency domain EC techniques, transmitter 102 of EM logging tool 100 may be fed by a continuous sinusoidal signal, producing primary magnetic fields that illuminate the concentric pipes (e.g., casing string 108 and pipe string 138). The primary electromagnetic fields produce Eddy currents in the concentric pipes. These Eddy currents, in turn, produce secondary electromagnetic fields that may be sensed and/or measured with the primary electromagnetic fields by the receivers 104. Characterization of the concentric pipes may be performed by measuring and processing these electromagnetic fields.

In time domain EC techniques, which may also be referred to as pulsed EC ("PEC"), transmitter 102 may be fed by a pulse. Transient primary electromagnetic fields may be produced due the transition of the pulse from "off" to "on" state or from "on" to "off" state (more common). These transient electromagnetic fields produce EC in the concentric pipes (e.g., casing string 108 and pipe string 138). The EC, in turn, produce secondary electromagnetic fields that may be sensed and/or measured by receivers 104 placed at some distance on the EM logging tool 100 from transmitter 102, as shown on FIG. 1. Alternatively, the secondary electromagnetic fields may be sensed and/or measured by a co-located receiver (not shown) or with transmitter 102 itself.

It should be understood that while casing string 108 is illustrated as a single casing string, there may be multiple layers of concentric pipes disposed in the section of wellbore 110 with casing string 108. EM log data may be obtained in two or more sections of wellbore 110 with multiple layers of concentric pipes. For example, EM logging tool 100 may make a first measurement of pipe string 138 comprising any suitable number of joints 130 connected by collars 132. Measurements may be taken in the time-domain and/or frequency range. EM logging tool 100 may make a second measurement in a casing string 108 of first casing 134, wherein first casing 134 comprises any suitable number of pipes connected by collars 132. Measurements may be taken in the time-domain and/or frequency domain. These measurements may be repeated any number of times and for second casing 136 and/or any additional layers of casing string 108. In this disclosure, as discussed further below, methods may be utilized to determine the location of any number of collars 132 in casing string 108 and/or pipe string 138. Determining the location of collars 132 in the frequency domain and/or time domain may allow for accurate processing of recorded data in determining properties of casing string 108 and/or pipe string 138 such as corrosion. As mentioned above, measurements may be taken in the frequency domain and/or the time domain.

In frequency domain EC, the frequency of the excitation may be adjusted so that multiple reflections in the wall of the pipe (e.g., casing string 108 or pipe string 138) are insignificant, and the spacing between transmitters 102 and/or receiver 104 is large enough that the contribution to the mutual impedance from the dominant (but evanescent) waveguide mode is small compared to the contribution to the mutual impedance from the branch cut component. The remote-field eddy current (RFEC) effect may be observed. In a RFEC regime, the mutual impedance between the coil of transmitter 102 and coil of one of the receivers 104 may be sensitive to the thickness of the pipe wall. To be more specific, the phase of the impedance varies as:

$$\varphi = 2\sqrt{\frac{\omega\mu\sigma}{2}}\, t \quad (1)$$

and the magnitude of the impedance shows the dependence:

$$\exp[-2(\sqrt{\omega\mu\sigma/2})t] \quad (2)$$

where ω is the angular frequency of the excitation source, μ is the magnetic permeability of the pipe, σ is the electrical conductivity of the pipe, and t is the thickness of the pipe. By using the common definition of skin depth for the metals as:

$$\delta = \sqrt{\frac{2}{\omega\mu\sigma}} \quad (3)$$

The phase of the impedance varies as:

$$\varphi \simeq 2\frac{t}{\delta} \quad (4)$$

and the magnitude of the impedance shows the dependence:

$$\exp[-2t/\delta] \quad (5)$$

In RFEC, the estimated quantity may be the overall thickness of the metal. Thus, for multiple concentric pipes, the estimated parameter may be the overall or sum of the thicknesses of the pipes. The quasi-linear variation of the phase of mutual impedance with the overall metal thickness may be employed to perform fast estimation to estimate the overall thickness of multiple concentric pipes. For this purpose, for any given set of pipes dimensions, material properties, and tool configuration, such linear variation may be constructed quickly and may be used to estimate the overall thickness of concentric pipes. Information handling system 144 may enable an operator to select analysis options, view collected log data, view analysis results, and/or perform other tasks.

Monitoring the condition of pipe string 138 and casing string 108 may be performed on information handling system 144 in oil and gas field operations. Information handling system 144 may be utilized with Electromagnetic (EM) Eddy Current (EC) techniques to inspect pipe string 138 and casing string 108. EM EC techniques may include frequency-domain EC techniques and time-domain EC techniques. In time-domain and frequency-domain techniques, one or more transmitters 102 may be excited with an excitation signal which broadcast an electromagnetic field and receiver 104 may sense and/or measure the reflected excitation signal, a secondary electromagnetic field, for interpretation. The received signal is proportional to the amount of metal that is around transmitter 102 and receiver 104. For example, less signal magnitude is typically an indication of more metal, and more signal magnitude is an indication of less metal. This relationship may be utilized to determine metal loss, which may be due to an abnormality related to the pipe such as corrosion or buckling.

Figure 2:
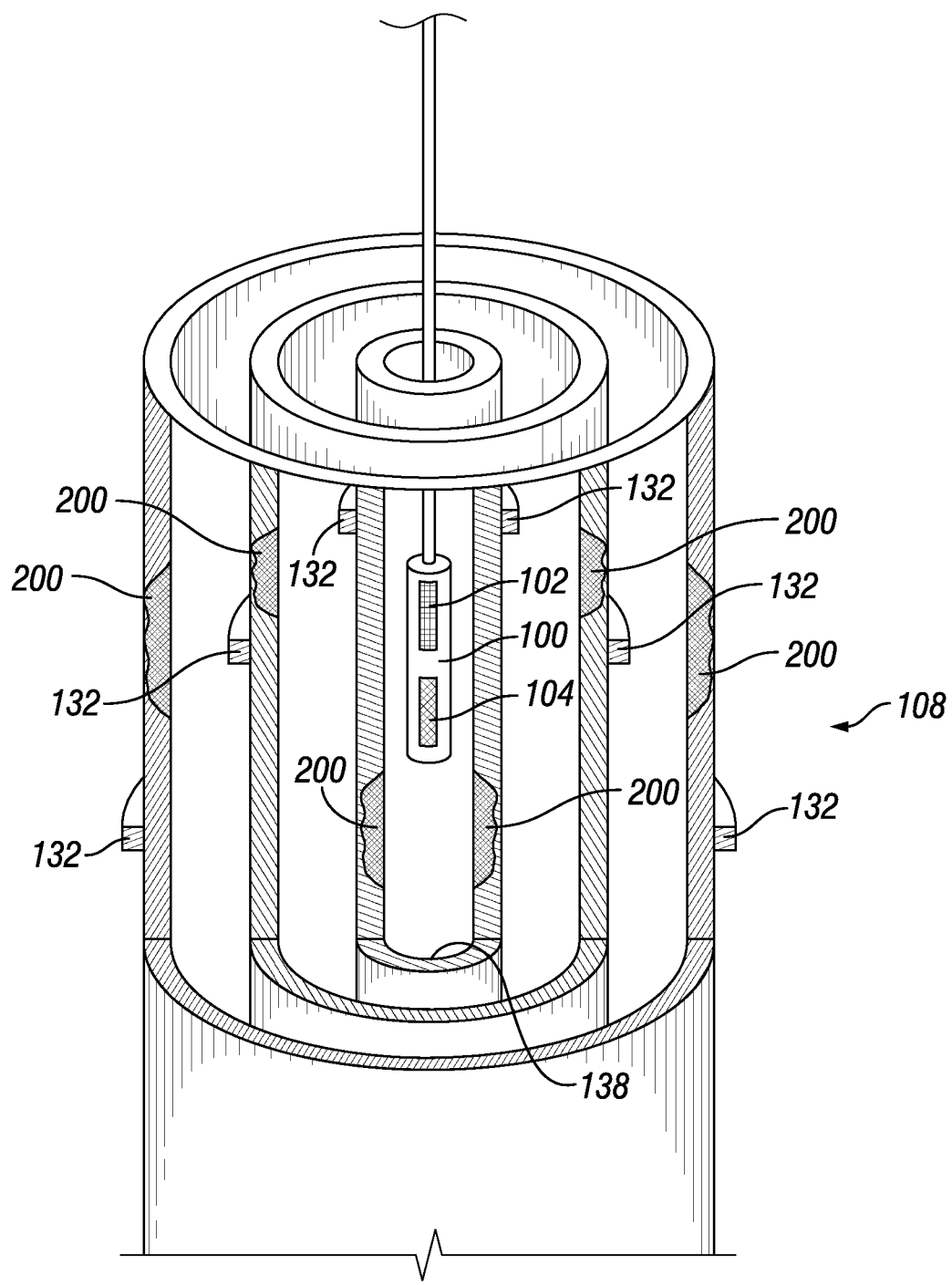
FIG. 2 illustrates an example of arbitrary defects within multiple pipes.
Figure 3A:
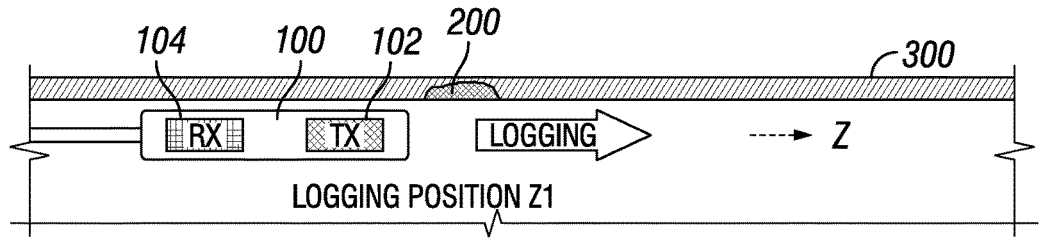
FIG. 3A illustrates an example of an EM logging tool traversing a wellbore.
Figure 3B:
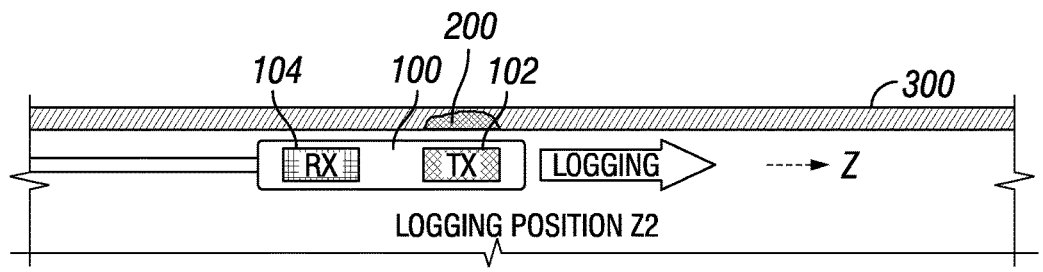
FIG. 3B illustrates another example of an EM logging tool traversing a wellbore.
Figure 3C:
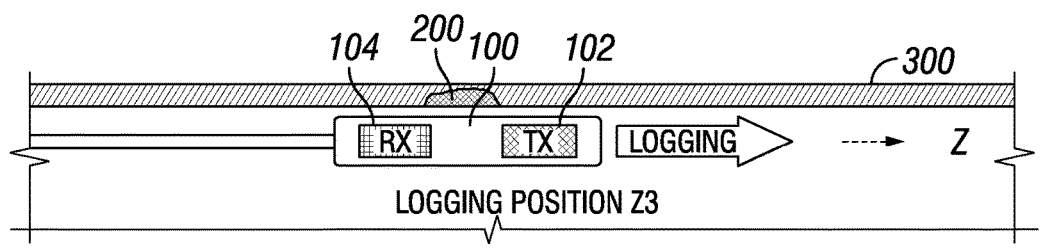
FIG. 3C illustrates another example of an EM logging tool traversing a wellbore.
Figure 3D:
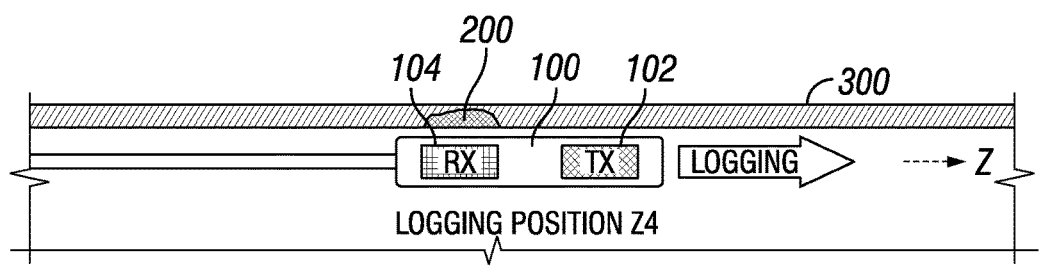
FIG. 3D illustrates another example of an EM logging tool traversing a wellbore.
Figure 3E:
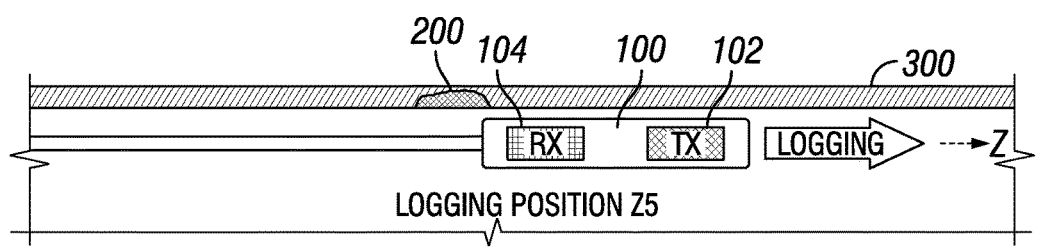
FIG. 3E illustrates another example of an EM logging tool traversing a wellbore.

FIG. 2 shows EM logging tool 100 disposed in pipe string 138 which may be surrounded by a plurality of nested pipes (i.e. first casing 134 and second casing 136) and an illustration of defects 200 disposed within the plurality of nested pipes. As EM logging tool 100 moves across pipe string 138 and casing string 108, one or more transmitters 102 may be excited, and a signal (mutual impedance between 102 transmitter and receiver 104) at one or more receivers 104, may be recorded.

Due to eddy current physics and electromagnetic attenuation, pipe string 138 and/or casing string 108 may generate an electrical signal that is in the opposite polarity to the incident signal and results in a reduction in the received signal. Typically, more metal volume translates to more lost signal. As a result, by inspecting the signal gains, it is possible to identify zones with metal loss (such as corrosion). In order to distinguish signals that originate from anomalies at different pipes of a multiple nested pipe configuration, multiple transmitter-receiver spacing and frequencies may be utilized. For example, short spaced transmitters 102 and receivers 104 may be sensitive to first casing 134, while longer spaced transmitters 102 and receivers 104 may be sensitive to second casing 136 and/or deeper (3rd, 4th, etc.) pipes. By analyzing the signal levels at these different channels with inversion methods, it is possible to relate a certain received signal to a certain metal loss or gain at each pipe. In addition to loss of metal, other pipe properties such as magnetic permeability and conductivity may also be estimated by inversion methods. However, there may be factors that complicate interpretation of losses. For example, deep pipe signals may be significantly lower than other signals. Double dip indications appear for long spaced transmitters 102 and receivers 104. Spatial spread of long spaced transmitter-receiver signals for a collar 132 may be long (up to 6 feet). Due to these complications, methods may need to be used to accurately inspect pipe features.

FIGS. 3A-3E illustrates an electromagnetic inspection and detection of anomalies, such as defects 200, or collars 132 (e.g., Referring to FIG. 2). As illustrated, EM logging tool 100 may be disposed in pipe string 138, by a conveyance, which may comprise any number of concentric pipes. As EM logging tool 100 traverses across pipe 300, one or more transmitters 102 may be excited, and a signal (mutual impedance between transmitter 102 and receiver 104) at one or more receivers 104, may be recorded. Due to eddy currents and electromagnetic attenuation, pipe 300 may generate an electrical signal that is in the opposite polarity to the incident signal and results in a reduction in a received signal. Thus, more metal volume translates to greater signal lost. As a result, by inspecting the signal gains, it may be possible to identify zones with metal loss (such as corrosion). Similarly by inspecting the signal loss, it may be possible to identify metal gain such as due to presence of a collar 132 (e.g., Referring to FIG. 1) where two pipes meet with a threaded connection. In order to distinguish signals from different pipes in a multiple concentric pipe configuration, multiple transmitter-receiver spacing and frequencies may be used. For example, short spaced transmitters 102 and receivers 104 may be sensitive to pipe string 138, while long spaced transmitters 102 and receivers 104 may be sensitive to deeper pipes (i.e. first casing 124, second casing 136, etc.). By analyzing the signal levels at these different channels through a process of inversion, it may be possible to relate a certain received signal set to a certain set of metal loss or gain at each pipe. In examples, there may be factors that complicate the interpretation and/or identification of collars 132 and/or defects 200.

For example, due to eddy current physics and electromagnetic attenuation, pipes disposed in pipe string 138 (e.g., Referring to FIG. 1 and FIG. 2) may generate an electrical signal that may be in the opposite polarity to the incident signal and results in a reduction in the received signal. Generally, as metal volume increase the signal loss may increase. As a result, by inspecting the signal gains, it may be possible to identify zones with metal loss (such as corrosion). In order to distinguish signals that originate from defects 200 (e.g., anomalies) at different pipes of a multiple nested pipe configuration, multiple transmitter-receiver spacing and frequencies may be used. For example, short spaced transmitters 102 and receivers 104 may be sensitive to first pipe string 138 (e.g., Referring to FIG. 2), while long spaced transmitters 102 and receivers 104 can be sensitive to deeper ($2^{nd}$, $3^{rd}$, etc.) pipes (i.e. first casing 134 and second casing 136).

Analyzing the signal levels at different channels with an inversion scheme, it may be possible to relate a certain received signal to a certain metal loss or gain at each pipe. In addition to loss of metal, other pipe properties such as magnetic permeability and electrical conductivity may also be estimated by inversion. There may be several factors that complicate interpretation of losses: (1) deep pipe signals may be significantly lower than other signals; (2) double dip indications appear for long spaced transmitters 102 and receivers 104; (3) Spatial spread of long spaced transmitter-receiver signal for a collar 132 may be long (up to 6 feet); (4) To accurately estimate of individual pipe thickness, the material properties of the pipes (such as magnetic permeability and electrical conductivity) may need to be known with fair accuracy; (5) inversion may be a non-unique process, which means that multiple solutions to the same problem may be obtained and a solution which may be most physically reasonable may be chosen. Due to these complications, an advanced algorithm or workflow may be used to accurately inspect pipe features, for example in examples with more than two pipes may be present in pipe string 138.

As EM logging tool 100 traverses across pipe 300 (e.g., Referring to FIG. 3), An EM log of the received signals may be produced and analyzed. The EM log may be calibrated prior to running inversion to account for the deviations between measurement and simulation (forward model). The deviations may arise from several factors, including the nonlinear behavior of the magnetic core, magnetization of pipes, mandrel effect, and inaccurate well plans. Multiplicative coefficients and constant factors may be applied, either together or individually, to the measured EM log for this calibration.

A calibrated log may then be inserted into an inversion scheme that may solve for a set of pipe parameters, including but not limited to, an individual thickness of each pipe, a percentage metal loss or gain, an individual mu and/or sigma of each pipe, a total thickness of each pipe, an eccentricity of each pipe, and an inner diameter of each pipe. An inversion scheme operates by identifying the most likely set of pipe parameters and adjusting them until a cost function may be minimized. The underlying optimization algorithm of the inversion scheme may be any one of the commonly-used algorithms, including but not limited to, the steepest descent, conjugate gradient, Gauss-Newton, Levenberg-Marquardt, and/or Nelder-Mead. Although the preceding examples may be conventional iterative algorithms, global approaches such as evolutionary and particle-swarm based algorithms may also be used. In examples, the cost function may be minimized using a linear search over a search vector rather than a sophisticated iterative or global optimization. The linear search, as mentioned earlier, has the advantage of being readily parallelizable, which may be advantageous as the cost of cloud computing decreases in the marketplace.

An example of the inversion cost function that may use the calibrated measurements is given below:

$$F(x) = \frac{1}{2M}\left\|W_{m,abs} \times \left(\frac{|\hat{m}| - |s(x)|}{|s(x)|}\right)\right\|_2^2 + \frac{1}{2M}\left\|W_{m,angle} \times \text{angle}\left\{\frac{\hat{m}}{s(x)}\right\}\right\|_2^2 + |W_x \times (x - x_{nom})|_1 \quad (6)$$

Where $\hat{m}$: vector of M complex-valued calibrated measurements such that $\hat{m}_{nom} = s_{nom}$. Additionally, $\hat{m}$ is a function of m that may be expanded as follows $$\hat{m} = a_0 + a_1 \times m + a_2 \times m^2 + \ldots \quad (7)$$

where $a_0, a_1, a_2, \ldots$ are calibration coefficients.

The cost function of Equation (6) may include three terms: a magnitude misfit, a phase misfit, and a regularization that may eliminate spurious non-physical solutions of the inversion problem. In examples, real and imaginary parts of the measurement and phase may also be used in the cost function. Many other norms (other than the 2-norm and 1-norm above) may also be used. Trivial interchanges of the measured and synthetic responses in the denominator terms may also be possible.

In examples, calibration becomes unnecessary by using a self-calibrated inversion cost function given below:

$$F(x) = \frac{1}{2M}\left\|W_{m,abs} \times \left(\frac{|m|}{|m_{nom}|} - \frac{|s(x)|}{|s_{nom}|}\right)\right\|_2^2 + \frac{1}{2M}\left\|W_{m,angle} \times \left(\text{angle}\left\{\frac{m}{m_{nom}}\right\} - \text{angle}\left\{\frac{s(x)}{s_{nom}}\right\}\right)\right\|_2^2 + |W_x \times (x - x_{nom})|_1 \quad (8)$$

where x is defined as vector of N unknowns (model parameters), for example:

$$x = [t_1, \ldots, t_{N_p}, \mu_1, \ldots, \mu_{N_p}, \sigma_1, \ldots, \sigma_{N_p}, \ldots], N_p \quad (9)$$

is the number of pipes. In examples, m is defined as a vector of M complex-valued measurements at different frequencies and receivers, as seen below:

$$M = N_{Rx} \times N_f \quad (10)$$

where $N_{Rx}$ is the number of receivers and $N_f$ is the number of frequencies. In examples, $m_{nom}$ is defined as a vector of M complex-valued nominal measurements. These may be computed as the signal levels of highest probability of occurrence within a given zone. In examples, s(x) is defined as a vector of M forward model responses. $s_{nom}$ is defined as a vector of M complex-valued forward model responses corresponding to the nominal properties of the pipes. Further, $W_{m,abs}$, $W_{m,angle}$ is defined as a measurements magnitude and phase weight matrices, for example M×M, diagonal matrices used to assign different weights to different measurements based on the relative quality or importance of each measurement. In examples, $W_x$ is defined as N×N diagonal matrix of regularization weights. $x_{nom}$ is defined as a vector of nominal model parameters and for N-dimensional vector y shown below:

$$\|y\|_2^2 = \Sigma_{i=1}^N |y_i|^2 \quad (11)$$

and $$|y|_1 = \Sigma_{i=1}^N |y_i| \quad (12)$$

It should be noted that division $$\frac{s(x)}{s} \quad (13)$$

is element-wise division.

The type of cost function in Equation (8) may be independent of the calibration as long as it is multiplicative. Therefore, the calibration step may become unnecessary if Equation (8) may be used as the cost function in inversion.

There may be various workflows in which to utilize to optimize a cost functional. In examples, the measurement magnitude matrix, phase weight matrix, diagonal matrix of regularization weights, calibration coefficients, and/or combinations thereof may be optimized to minimize a given objective functional. In further examples, $|W_x \times (x - x_{nom})|_p$, which is defined as the regularization norm order may additionally be optimized to minimize a given objective functional. The objective functional may be defined in various terms such as:

$$E[x \cdot x^T] \quad (14)$$

where $E[x \cdot x^T]$ is defined as the cross-correlation of estimated pipe properties, the cross-covariance of estimated pipe properties, as seen below:

$$\text{cov}(x,x) = E[(x - E(x)) \cdot (x - E(x))^T] \quad (15)$$

variation in estimated pipe properties among different inversion zones, as seen below:

$$\frac{x_{zonen} - x_{zonem}}{x_{zonen}} \quad (16)$$

the error in the inversion of a known feature (e.g., a collar of any other features of pre-known properties), and/or combinations thereof. Without limitation, different embodiments of an objective functional may be listed in Table 1 and different embodiments of a cost functional may be listed in Table 2, as seen below:

TABLE 1

| Objective Functional |
| --- |
| Cross-covariance |
| Inversion error of known features |
| Variation of estimated pipe thickness of the same pipe among zones |

TABLE 2

Cost Functional Parameters

Figure 4:
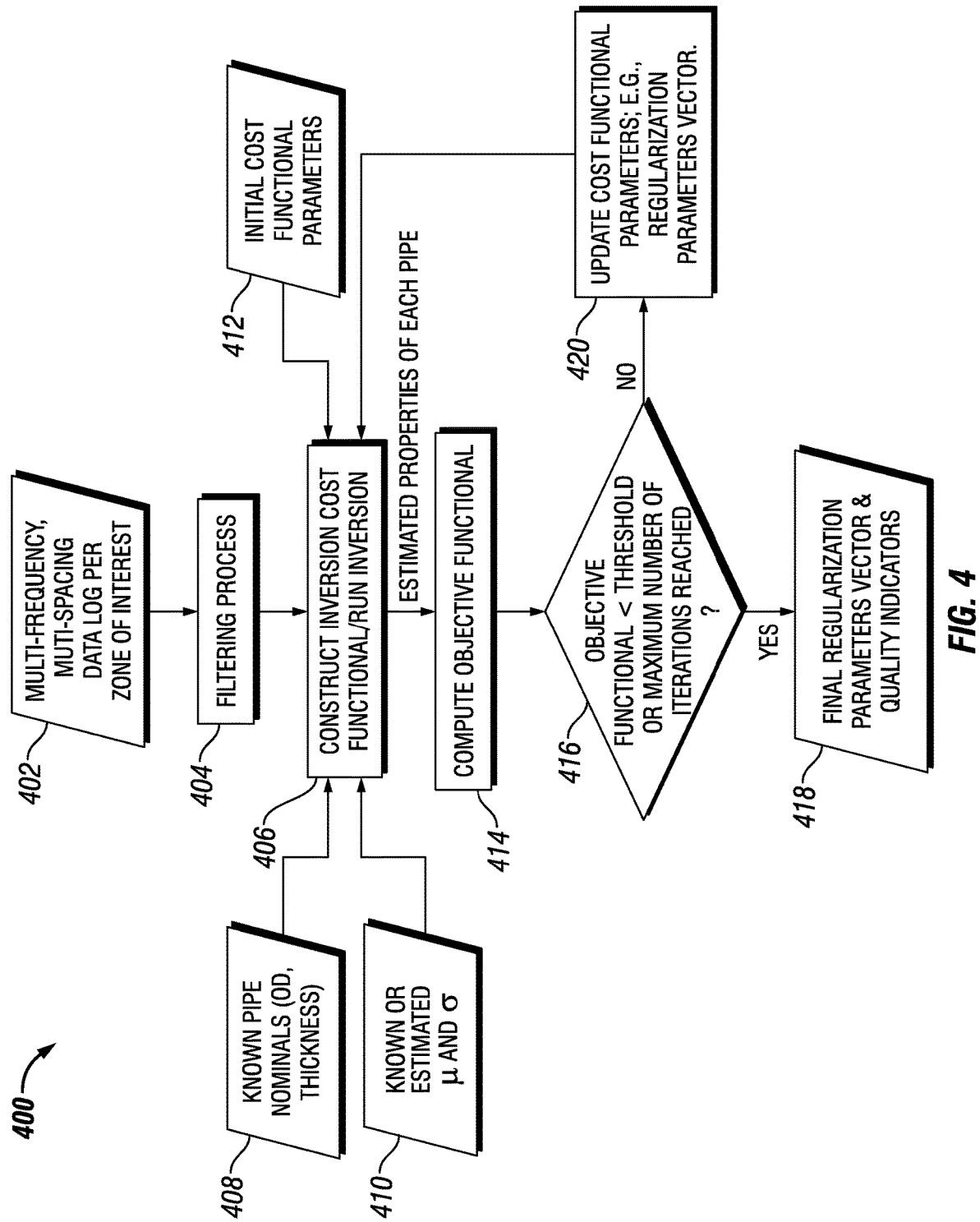
FIG. 4 illustrates a flow chart for adaptive adjustment of a vector comprising regularization parameters.

Regularization parameters vector
Regularization norm order
Channel weights
Calibration coefficients FIG. 4 illustrates a flow chart 400 for adaptive adjustment of a vector comprising regularization parameters. The choice of the optimum regularization weights (parameters), which may determine the weight of the regularization term in the cost function with respect to the misfit term, may be automated using flow chart 400 as disclosed in FIG. 4. As mentioned above, the last term in Equation (6) or Equation (8) is defined as the regularization term, and the weights $W_x$ are defined as regularization parameters. Regularization may be a common optimization technique for dealing with ill-posedness (or extreme sensitivity to errors in measurement) which may often be encountered in practical applications. In examples, the optimum regularization weights may be chosen by the minimization of the negative correlation (or mirroring) between curves of various pipe properties. Mirroring may point to ill-posedness in the problem, which may be remediated by regularization. The optimum regularization parameter may be the one that minimizes the mirroring between thickness curves.

As illustrated, in step 402 a multi-frequency, multi-spacing data log per zone of interest may be compiled. After the data log is compiled in step 402, the data log may be sent to step 404, where a filtering process is performed. In examples, the filtering process may produce a sparsely down-sample log. The size and/or amount of data contained within the data log may be reduced based on a variety of factors in step 404. The resultant data log from the filtering process in step 404 is then sent to step 406. In step 406, an operator may construct an inversion cost functional and run the inversion. A variety of inputs may be required to create the inversion cost functional. For example, in step 408, the known pipe nominals may be determined and then sent to step 406. Without limitation, the know pipe nominals may be the outer diameter, the pipe wall thickness, and/or the like. In step 410, the known or estimated conductivity ($\sigma$) and magnetic permeability ($\mu$) may be sent to step 406. Additionally, in step 412 the initial cost functional parameters may be sent to step 406. Without limitation, initial cost functional parameters may be the measurement weights, the regularization norm order, the regularization parameters vector, the calibration coefficients, and/or combinations thereof. Once the requisite inputs have been sent to step 406, the inversion cost functional may be run. Throughout the operation of the inversion cost functional, estimated properties of each pipe may be determined. When the inversion cost functional has completed, the estimated properties of each pipe may be sent to step 414. In step 414 the operator may compute the objective functional. After computing the objective functional, the objective functional may be sent to step 416, which may propose a logical split in flow chart 400.

Step 416 may determine whether or not the objective functional has fallen below a threshold (e.g., 0.01) or if the maximum number of iterations has been reached. If the objective functional has fallen below a threshold or the maximum number of iterations has been reached, a concluding step 418 that identifies the final regularization parameters vector and quality indicators may end the course of flow chart 400. If the objective functional has not fallen below a threshold or the maximum number of iterations has not been reached, step 420 may occur. Step 420 may update the cost functional parameters (e.g., the regularization parameters vector). The updated cost functional parameters from step 420 may be fed back to step 406 wherein another inversion cost functional may be constructed and inversion run again, forming a feedback loop. In this example, in addition to the inputs from step 408, step 410, and step 412, the updated cost functional parameters of step 420 may be implemented in the construction of another inversion cost functional. The process may repeat a plurality of times until the logical decision in step 416 is satisfied to lead to concluding step 418. In step 418 a final cost functional parameters and quality indicators may be determined. The cost functional parameters thus optimized may then be inserted into the cost functional of Equation (6) or Equation (8) for subsequent estimation of the unknown vector (x), which may represent an unknown set of pipe thicknesses, pipe permeabilities, pipe conductivities, pipe inner or outer diameters, or pipe eccentricities.

Figure 5:
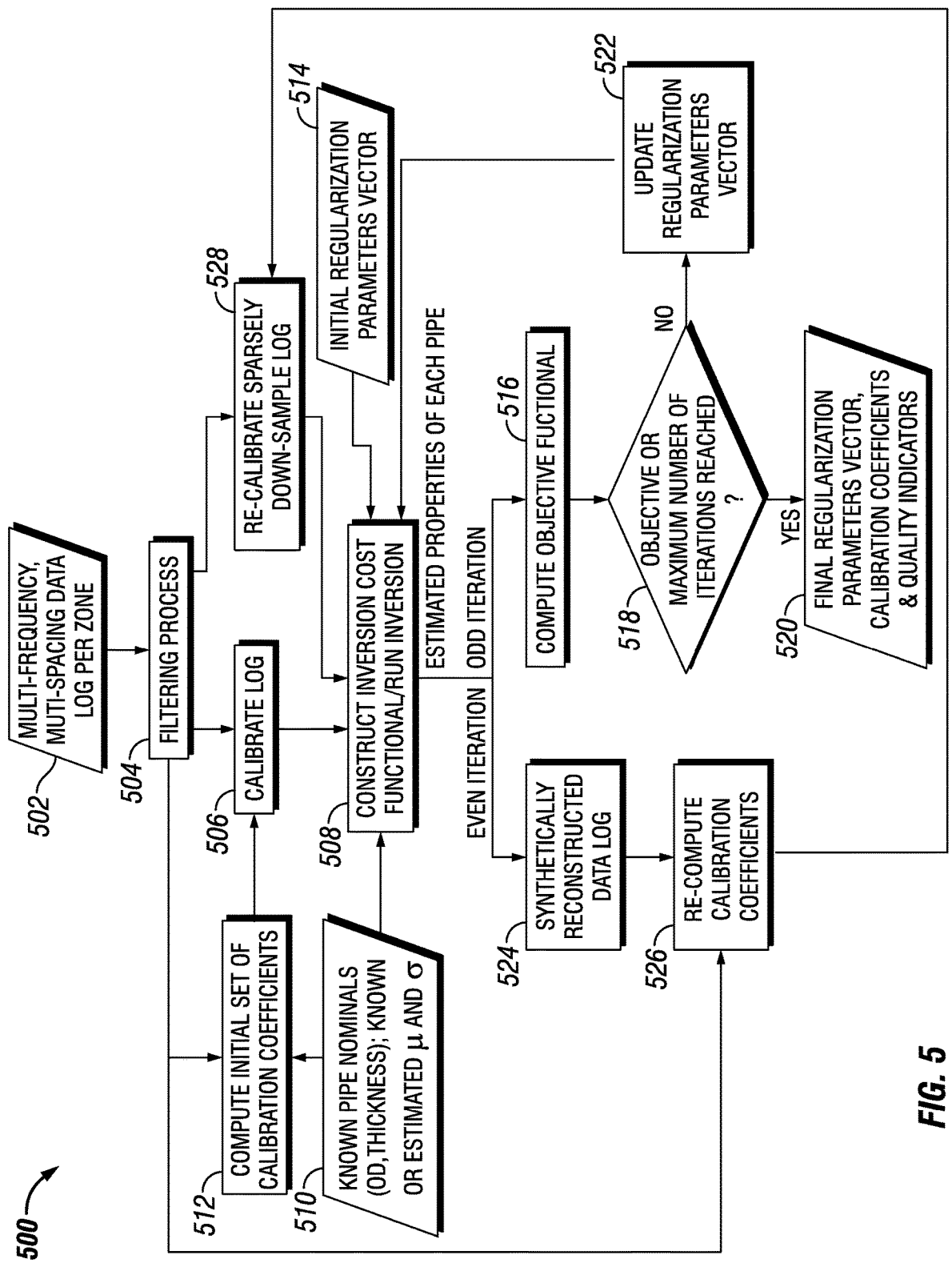
FIG. 5 illustrates a flow chart for adaptive adjustment of a vector comprising regularization parameters and calibration coefficients.

FIG. 5 illustrates a flow chart 500 for the adaptive adjustment of a vector comprising regularization parameters and calibration coefficients. In this example, the regularization parameters vector and the calibration coefficients may both be optimized at alternative iterations of the optimization process. The objective functional to be minimized may be chosen as the cross-correlation between curves of various pipe properties. The objective functional may include the variation of pipe properties among different inversion zones. In the odd iterations, the regularization parameters vector may be updated to minimize the objective functional, and the inversion may be run to obtain an intermediate set of pipe parameters. In the even iterations, the calibration coefficients may be refined by curve fitting the measured log to a synthetically reconstructed log computed by forward modeling the intermediate set of pipe parameters.

As illustrated, in step 502 a multi-frequency, multi-spacing data log per zone may be compiled. After the data log is compiled in step 502, the data log may be sent to step 404, where a filtering process is performed. In examples, the filtering process may produce a sparsely down-sample log. The size and/or amount of data contained within the data log may be reduced based on a variety of factors in step 504. The resultant data log from the filtering process in step 504 is then sent to step 506. In step 506, calibration of the sparsely down-sample log may be performed. In examples, the data log may be calibrated to partially remove error within the measurements acquired in step 502. The calibrated data log may then be sent to step 508. In step 508, an operator may construct an inversion cost functional and run the inversion. A variety of inputs may be required to create the inversion cost functional. In step 510, the known pipe nominals, the known conductivity ($\sigma$) and magnetic permeability ($\mu$), and/or the estimated 6 and n may be sent to step 508. Without limitation, the known pipe nominals may be the outer diameter, the pipe wall thickness, and/or the like. Additionally, the inputs of step 510 may be sent to step 512. In step 512, the inputs from step 510 may be used to compute an initial set of calibration coefficients. The calibration coefficients may be utilized in the calibration process of step 506. Another input to step 508 may be provided by step 514. In step 514, an initial regularization parameters vector may be determined. The initial regularization parameters vector may be a starting estimate of values to later be iterated in a loop. Once the requisite inputs have been sent to step 508, the inversion cost functional may be run in step 508.

In examples, there may be even and/or odd iterations of running the inversion cost functional. A first iteration may be designated as an odd iteration. Throughout the operation of the inversion cost functional, the estimated properties of each pipe may be determined. When the inversion cost functional has completed, the estimated properties of each pipe may be sent to step 516. In step 516 the operator may compute the objective functional. After computing the objective functional, the objective functional may be sent to step 518, which may propose a logical split in flow chart 400.

Step 518 may determine whether or not the objective functional has fallen below a threshold (for example, 0.01) or if the maximum number of iterations has been reached. If the objective functional has fallen below a threshold or the maximum number of iterations has been reached, a concluding step 520 that identifies the final regularization parameters vector and quality indicators may end the course of flow chart 500. If the objective functional has not fallen below a threshold or the maximum number of iterations has not been reached, step 522 may occur. Step 522 may update the cost functional parameters (e.g., the regularization parameters vector). The updated cost functional parameters from step 522 may be fed back to step 508 wherein another inversion cost functional may be constructed and inversion run again, forming a feedback loop. In this example, in addition to the inputs from step 510, step 512, and step 514, the updated cost functional parameters of step 522 may be implemented in the construction of another inversion cost functional. The process may repeat a plurality of times until the logical decision in step 518 is satisfied to lead to step 520. In step 520 a final cost functional parameters and quality indicators may be determined. The cost functional parameters thus optimized may then be inserted into the cost functional of Equation (6) or Equation (8) for subsequent estimation of the unknown vector (x), which may represent an unknown set of pipe thicknesses, pipe permeabilities, pipe conductivities, pipe inner or outer diameters, or pipe eccentricities.

In examples, the inversion cost functional produced with the regularization parameters vector of step 522 may be designated as a second iteration. The second iteration may subsequently be an even iteration. When the inversion cost functional has completed, the estimated properties of each pipe may be sent to step 524. In step 524, a synthetically reconstructed data log may be computed by forward modeling the intermediate set of pipe parameters. The synthetically reconstructed data log may be sent to step 526. In step 526, the operator may re-compute calibration coefficients. In examples, step 526 may utilize the resultant data log from the filtering process in step 504 as an input. In step 526, the calibration coefficients may be re-computed by curve fitting the resultant data log to the synthetically reconstructed data log of step 524. The re-computed calibration coefficients may then be sent to step 528. Step 528 may re-calibrate the sparsely down-sample log from step 504. In examples, the resultant data log may be re-calibrated to partially remove error when in comparison with the re-computed calibration coefficients. The re-calibrated data log from step 528 may be sent to step 508 wherein another inversion cost functional may be constructed and run. In this example, in addition to the inputs from step 506, step 510, step 514, and step 522, the re-calibrated data log of step 528 may be implemented in the construction of another inversion cost functional. The process may be repeated a plurality of times until the logical decision in step 518 is satisfied to lead to concluding step 520. In step 520 a final cost functional parameters, calibration coefficients, and quality indicators may be determined. The cost functional parameters thus optimized may then be inserted into the cost functional of Equation (6) or Equation (8) for subsequent estimation of the unknown vector (x), which may represent a set of pipe thicknesses, pipe permeabilities, pipe conductivities, pipe inner or outer diameters, or pipe eccentricities.

Figure 6:
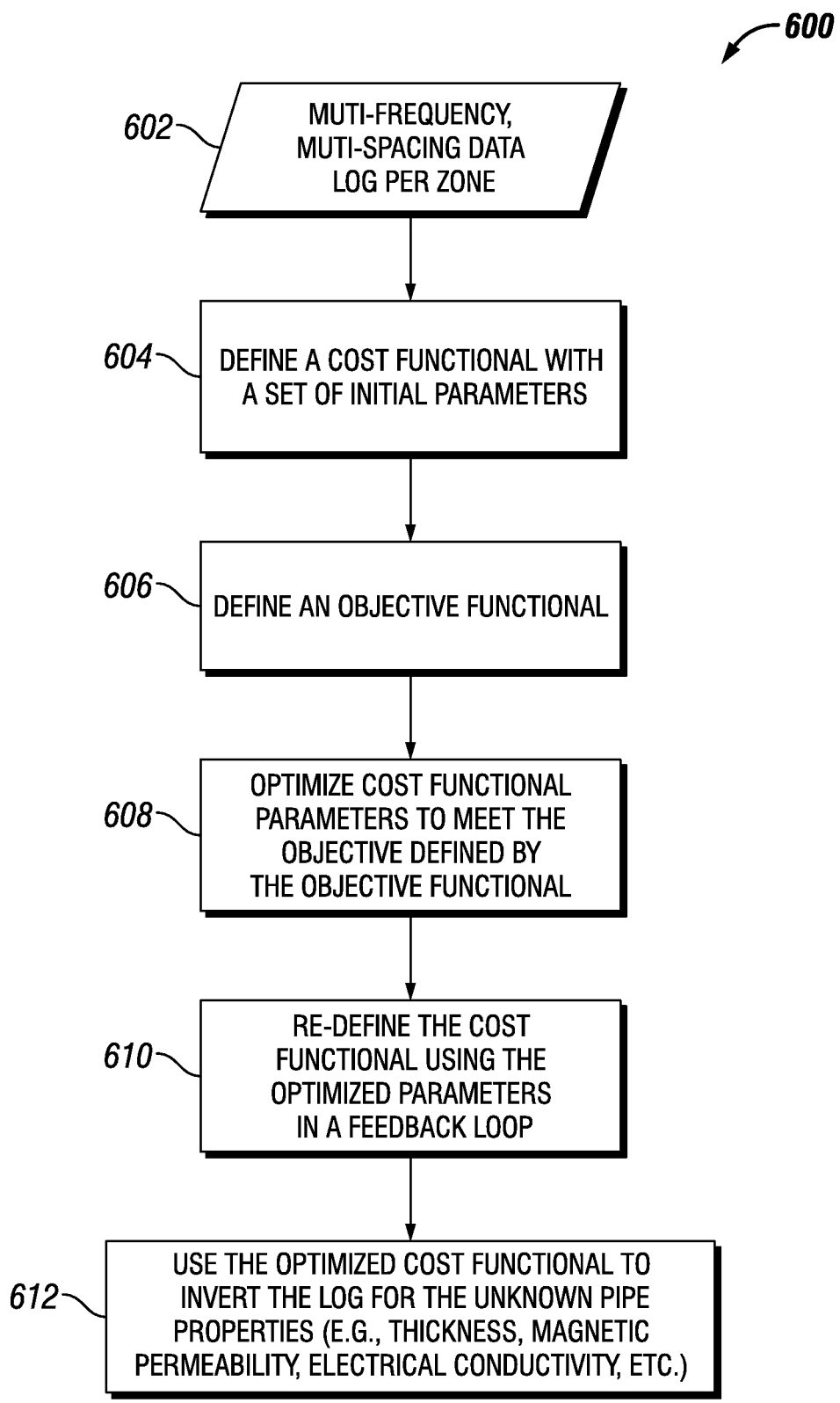
FIG. 6 illustrates a flow chart illustrating an overview for optimizing a cost functional that is used to solve for an unknown pipe property.

FIG. 6 illustrates a workflow 600 that is a simplified overview for optimizing a cost functional that is used to solve for an unknown pipe property. Workflow 600 may begin with step 602. In step 602, a multi-frequency and multi-spacing data log per zone may be created. In examples, this data log may be populated from measurements taken by EM Logging Tool 100 (e.g., referring to FIG. 1). After finding a data log in step 602, in step 604 an operator may define a cost functional with a set of initial parameters. Next, in step 606 an operator may define an objective functional. In step 608 an operator may optimize cost functional parameters to meet the objective defined by the objective functional. Step 610 may be an example of a feedback loop for workflow 600. In step 610 an operator may re-define the cost functional using the optimized parameters in a feedback loop. Information from step 610 may be used in step 612. In step 612 an operator may use the optimized cost functional to invert the log for the unknown pipe properties (e.g., thickness, magnetic permeability, electrical conductivity, etc.).

The present disclosure may propose a method for improving the quality of thickness estimation of each one of a plurality of nested pipes by automatically optimizing the inversion cost functional. This may include optimizing the regularization term, calibration coefficients, and channel weights to satisfy a pre-defined objective functional. The objective functional may be defined in terms of the cross-covariance of estimated thicknesses of different pipe strings. The proposed method may provide means for improving and assessing the quality of a pipe inspection (e.g., EPXV pipe inspection answer product). Further, the method may improve the performance by removing the need to run an inversion multiple times with different regularization parameters.

This method and system may include any of the various features of the compositions, methods, and system disclosed herein, including one or more of the following statements.

Statement 1. A method for estimating individual pipe properties of each one of a plurality of nested pipes using induction measurements, comprising: disposing an induction tool in a cased hole, wherein the induction tool comprises a transmitter and a receiver; broadcasting electromagnetic fields from the transmitter into a subterranean formation to form an eddy current; recording the eddy current with the receiver to produce induction measurements; obtaining a log comprising at least one channel from the induction measurements; constructing an inversion cost functional comprising a misfit term and a regularization term; performing a first inversion using the inversion cost functional to estimate a set of pipe properties at a first plurality of depth points; optimizing the inversion cost functional such that the estimated set of pipe properties at the first plurality of depth points minimize an objective functional; performing a second inversion using the optimized inversion cost functional to estimate a set of pipe properties at a second plurality of depth points; and displaying the set of pipe properties at the second plurality of depth points to a user.

Statement 2. The method of statement 1, wherein the induction measurements are multi-frequency, multi-spacing measurements recorded by a frequency-domain tool.

Statement 3. The method of statement 1 or 2, wherein the induction measurements are measurements recorded by a time-domain tool at receivers with different sizes and at different time delays.

Statement 4. The method of any of the preceding statements, wherein the induction measurements are performed with different transmitters active at different times.

Statement 5. The method of any of the preceding statements, wherein the set of pipe properties at the first plurality of depth points includes an individual thickness of each pipe, a percentage metal loss or gain of each pipe, an individual magnetic permeability of each pipe, an individual electrical conductivity of each pipe, a total thickness of each pipe, an eccentricity of each pipe, an inner diameter of each pipe, an outer diameter of each pipe, and an ovality of each pipe.

Statement 6. The method of any of the preceding statements, wherein the optimizing the inversion cost functional further comprises optimizing the regularization term.

Statement 7. The method of statement 6, further comprising optimizing the regularization term includes optimizing at least one of the regularization parameters and an order of norm of the regularization term for each one of the pipe properties from the set of pipe properties at the first plurality of depth points.

Statement 8. The method of any of the preceding statements, wherein the optimizing the inversion cost functional further comprises optimizing weights of different channels.

Statement 9. The method of any of the preceding statements, wherein the log is calibrated prior to running inversion to minimize a difference between measured and simulated responses using known pipe nominals and pipe material properties.

Statement 10. The method of statement 9, wherein optimizing the inversion cost functional further comprises optimizing calibration coefficients.

Statement 11. The method of statement 10, further comprising curve fitting a measured log to a synthetically reconstructed log of each one of the channels to obtain the calibration coefficients.

Statement 12. The method of statement 11, wherein the curve fitting measured log is linear or higher order.

Statement 13. The method of statement 12, further comprising outputting an error of the curve fitting measured log as a quality indicator of the inversion.

Statement 14. The method of any of the preceding statements, wherein optimizing the objective functional further comprises minimizing a cross-correlation or cross-covariance among estimated pipe properties on different pipes.

Statement 15. The method of statement 14, wherein the residual cross-covariance is output as a quality indicator of the inversion.

Statement 16. The method of any of the preceding statements, wherein the set of pipe properties at the first plurality of depth points are inverted in at least one inversion zone, wherein a plurality of pipes, their individual weights, and their individual inner diameters are invariant in the inversion zone.

Statement 17. The method of statement 16, wherein optimizing the objective functional further comprises minimizing the variation in the mean and variance of the estimated properties of the same pipe string computed in different inversion zones.

Statement 18. The method of any of the preceding statements, wherein the process of optimizing the inversion cost functional is done iteratively until the objective functional is satisfied.

Statement 19. The method of any of the preceding statements, wherein the inversion of individual depth points is parallelized on multiple processors.

Statement 20. The method of any of the preceding statements, wherein the first plurality of depth points is a representative subset of the second plurality of depth points.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for estimating individual pipe properties of each one of a plurality of nested pipes using induction measurements, comprising:
   disposing an induction tool in a cased hole, wherein the induction tool comprises a transmitter and a receiver;
   broadcasting electromagnetic fields from the transmitter into a subterranean formation to form an eddy current;
   recording the eddy current with the receiver to produce induction measurements;
   obtaining a log comprising at least one channel from the induction measurements;
   constructing an inversion cost functional comprising a misfit term and a regularization term;
   performing a first inversion using the inversion cost functional to estimate a set of pipe properties at a first plurality of depth points;
   optimizing the inversion cost functional such that the estimated set of pipe properties at the first plurality of depth points minimize an objective functional;
   performing a second inversion using the optimized inversion cost functional to estimate a set of pipe properties at a second plurality of depth points; and
   displaying the set of pipe properties at the second plurality of depth points to a user.

2. The method of claim 1, wherein the induction measurements are multi-frequency, multi-spacing measurements recorded by a frequency-domain tool.

3. The method of claim 1, wherein the induction measurements are measurements recorded by a time-domain tool at receivers with different sizes and at different time delays.

4. The method of claim 1, wherein the induction measurements are performed with different transmitters active at different times.

5. The method of claim 1, wherein the set of pipe properties at the first plurality of depth points includes an individual thickness of each pipe, a percentage metal loss or gain of each pipe, an individual magnetic permeability of each pipe, an individual electrical conductivity of each pipe, a total thickness of each pipe, an eccentricity of each pipe, an inner diameter of each pipe, an outer diameter of each pipe, and an ovality of each pipe.

6. The method of claim 1, wherein the optimizing the inversion cost functional further comprises optimizing the regularization term.

7. The method of claim 6, further comprising optimizing the regularization term includes optimizing at least one of the regularization parameters and an order of norm of the regularization term for each one of the pipe properties from the set of pipe properties at the first plurality of depth points.

8. The method of claim 1, wherein the optimizing the inversion cost functional further comprises optimizing weights of different channels.

9. The method of claim 1, wherein the log is calibrated prior to running inversion to minimize a difference between measured and simulated responses using known pipe nominals and pipe material properties.

10. The method of claim 9, wherein optimizing the inversion cost functional further comprises optimizing calibration coefficients.

11. The method of claim 10, further comprising curve fitting a measured log to a synthetically reconstructed log of each one of the channels to obtain the calibration coefficients.

12. The method of claim 11, wherein the curve fitting measured log is linear or higher order.

13. The method of claim 12, further comprising outputting an error of the curve fitting measured log as a quality indicator of the inversion.

14. The method of claim 1, wherein optimizing the objective functional further comprises minimizing a cross-correlation or cross-covariance among estimated pipe properties on different pipes.

15. The method of claim 14, wherein the residual cross-covariance is output as a quality indicator of the inversion.

16. The method of claim 1, wherein the set of pipe properties at the first plurality of depth points are inverted in at least one inversion zone, wherein a plurality of pipes, their individual weights, and their individual inner diameters are invariant in the inversion zone.

17. The method of claim 16, wherein optimizing the objective functional further comprises minimizing the variation in the mean and variance of the estimated properties of the same pipe string computed in different inversion zones.

18. The method of claim 1, wherein the process of optimizing the inversion cost functional is done iteratively until the objective functional is satisfied.

19. The method of claim 1, wherein the inversion of individual depth points is parallelized on multiple processors.

20. The method of claim 1, wherein the first plurality of depth points is a representative subset of the second plurality of depth points.

* * * * *